(12) United States Patent
Hildebrand et al.

(10) Patent No.: US 11,210,619 B2
(45) Date of Patent: Dec. 28, 2021

(54) PASSENGER AIRCRAFT SEAT CONFIGURATION ACROSS MULTIPLE PASSENGER AIRCRAFT TO REDUCE FUEL CONSUMPTION

(71) Applicants: Wolfgang Hildebrand, Wiesbaden (DE); Anja Wiesmeier, Wiesbaden (DE)

(72) Inventors: Wolfgang Hildebrand, Wiesbaden (DE); Anja Wiesmeier, Wiesbaden (DE)

(*) Notice: Subject to any disclaimer, the term of this patent is extended or adjusted under 35 U.S.C. 154(b) by 0 days.

(21) Appl. No.: 16/648,867

(22) PCT Filed: May 11, 2018

(86) PCT No.: PCT/EP2018/062238
§ 371 (c)(1),
(2) Date: Mar. 19, 2020

(87) PCT Pub. No.: WO2019/057348
PCT Pub. Date: Mar. 28, 2019

(65) Prior Publication Data
US 2020/0250604 A1    Aug. 6, 2020

(30) Foreign Application Priority Data
Sep. 21, 2017    (EP) .................................... 17192397

(51) Int. Cl.
*G06Q 10/06*    (2012.01)
*G06Q 10/04*    (2012.01)
*G06Q 10/02*    (2012.01)

(52) U.S. Cl.
CPC ....... *G06Q 10/06315* (2013.01); *G06Q 10/02* (2013.01); *G06Q 10/047* (2013.01)

(58) Field of Classification Search
CPC ... B64D 11/06; B64D 11/064; B64D 11/0601; G06Q 10/0631; G06Q 10/047
See application file for complete search history.

(56) References Cited

U.S. PATENT DOCUMENTS 4,936,527 A * 6/1990 Gorges ..................... B64C 1/20
104/165
5,611,503 A * 3/1997 Brauer ................... B64D 11/00
244/118.6

(Continued)

FOREIGN PATENT DOCUMENTS

DE          10211437 A1    10/2003
DE       102009001366 A1     9/2010

(Continued)

OTHER PUBLICATIONS

Park, Yongha et al., Fuel burn rates of commercial passenger aircraft: variations by seat configuration and stage distance Journal of Transport Geography, vol. 41, 2014 (Year: 2014).*

(Continued)

*Primary Examiner* — Scott L Jarrett
(74) *Attorney, Agent, or Firm* — Hudak, Shunk & Farine Co. LPA (57) ABSTRACT

A method for reducing the consumption of fuel by passenger aircraft in an air transportation system which includes at least two airports between which there is at least one flight route, having the following steps: a) retrieving flight data F relating to the airports from a first memory; b) determining a flight route along which a number of n≥2 flights, whose departure times are in a first time window T1 by means of n first passenger aircraft are carried out, from the flight data F; c) determining a total number of passengers Z of the n flights and storing the total number of passengers Z in a second memory; d) selecting m≤n−1 second passenger aircrafts with a total capacity of $G_m \geq Z$ for carrying out m (Continued)

flights; e) retrieving passenger data P of the n flights from a third memory and storing the passenger data P in the second memory; f) configuring equipment features $M_m$ of the m second passenger aircrafts taking into account the passenger data P; g) carrying out the m flights along the determined flight route with the m second passenger aircrafts with departure times in the first time window $T1$.

8 Claims, 5 Drawing Sheets

(56) References Cited

U.S. PATENT DOCUMENTS

| | | | | |
|---|---|---|---|---|
| 6,804,658 | B2* | 10/2004 | Lim | G06Q 10/02 705/6 |
| 6,929,218 | B1* | 8/2005 | Sanford | B64D 11/06 244/118.5 |
| 6,968,298 | B2* | 11/2005 | Lohmann | G06F 30/15 703/1 |
| 7,137,594 | B2* | 11/2006 | Mitchell | B64D 11/00 244/118.6 |
| 7,194,391 | B2* | 3/2007 | Conchi | B64D 11/0601 703/2 |
| 7,232,094 | B2* | 6/2007 | Bishop | B60N 2/01575 244/118.6 |
| 8,321,252 | B2* | 11/2012 | Gliozzi | G06Q 10/0631 705/7.12 |
| 8,423,324 | B2* | 4/2013 | Boin | B61D 1/04 703/1 |
| 8,910,907 | B2* | 12/2014 | Gonnsen | B64D 11/064 244/118.6 |
| 9,197,906 | B1* | 11/2015 | Kathol | H04L 67/12 |
| 9,523,985 | B1* | 12/2016 | Barnes | B64D 43/00 |
| 9,633,402 | B1* | 4/2017 | McCartney | G06Q 30/0629 |
| 10,181,005 | B2* | 1/2019 | Whang | G06F 30/13 |
| 10,665,114 | B2* | 5/2020 | Irrgang | G07C 5/0816 |
| 2005/0027579 | A1* | 2/2005 | Tiourine | G06Q 10/06375 705/7.37 |
| 2005/0061914 | A1* | 3/2005 | Bishop | B60N 2/01575 244/118.5 |
| 2005/0209830 | A1* | 9/2005 | Lee | G06F 30/15 703/1 |
| 2007/0284923 | A1* | 12/2007 | Thoreux | B60N 2/0244 297/217.3 |
| 2012/0191332 | A1* | 7/2012 | Sawhill | G08G 5/045 701/120 |
| 2012/0310680 | A1* | 12/2012 | Bourla | G06Q 10/04 705/5 |
| 2013/0035906 | A1* | 2/2013 | Schmidt-Schaffer | G06F 30/00 703/1 |
| 2014/0129281 | A1* | 5/2014 | Struzik | G07C 5/08 705/7.23 |
| 2014/0278270 | A1* | 9/2014 | Savian | B64D 11/00 703/1 |
| 2015/0149137 | A1* | 5/2015 | Echtermeyer | G06F 30/15 703/8 |
| 2015/0279217 | A1* | 10/2015 | Chen | G06Q 10/0631 701/123 |
| 2017/0109666 | A1* | 4/2017 | Gonnsen | G06Q 10/0631 |
| 2018/0170550 | A1* | 6/2018 | Streckert | H04N 21/41422 |
| 2018/0209866 | A1* | 7/2018 | Gonnsen | B64D 11/06 |
| 2018/0210998 | A1* | 7/2018 | Gonnsen | B64D 11/04 |

FOREIGN PATENT DOCUMENTS

| | | |
|---|---|---|
| DE | 102014204926 A1 | 10/2015 |
| GB | 2524495 A | 9/2015 |

OTHER PUBLICATIONS

Swan, William M. et al., Aircraft trip cost parameters: A function of stage length and seat capacity Transportation Research Page E, vol. 42, 2006 (Year: 2006).*

Burzlaff, Marcus, Aircraft Fuel Consumption—Estimation and Visualization Hamburg University of Applied Science, Dec. 13, 2017 (Year: 2017).*

Kopisch et al., Configuration of a Passenger Aircraft Cabin based on Conceptual Hierarchy, Constraints and Flexible Control, Industrial and Engineering Applications of Artificial Intelligence and Expert Systems, Springer Berlin Jun. 1992 (Year: 1992).*

* cited by examiner

PASSENGER AIRCRAFT SEAT CONFIGURATION ACROSS MULTIPLE PASSENGER AIRCRAFT TO REDUCE FUEL CONSUMPTION

FIELD OF THE INVENTION

The present invention concerns a method and system for reducing the fuel consumption of passenger aircraft in an air transport system.

BACKGROUND OF THE INVENTION

Air traffic is an essential component of the global transport system. Compared to other means of transport (motor vehicles, ships, railways), passenger and freight aircraft offer, among other things, a generally much faster transport, whereby this advantage increases with the distance to be covered. It should be noted that passenger aircraft are generally not only used to transport passengers, but also regularly carry cargo (belly freight).

In addition to passenger planes, there are also cargo planes that are at least primarily intended for transporting freight, but in exceptional cases can also transport individual passengers. When we speak of airplanes in general terms, we mean both passenger and freight planes.

A reduction in fuel consumption is understood to mean in particular a reduction in fuel consumption per flown (transported) passenger seat or passenger flown.

In general, improving the utilization of a means of transport can reduce fuel consumption per passenger flown. The improvement of the average load factor of a means of transport is also referred to as capacity optimization in the following. A reduction in fuel consumption is achieved through capacity optimization.

In the past, capacity optimization in passenger and freight transport was primarily driven by economic considerations, since capacity optimization is accompanied by a reduction in relative fuel consumption (for example, fuel consumption per passenger and kilometer travelled). The lower the fuel consumption for the transport of passengers or goods, the lower the associated costs for airlines and end consumers. Against the background of global warming, environmental compatibility and in particular fuel savings and the associated reduction in $CO_2$ emissions have additionally become a social objective aimed at preventing or limiting further global warming.

The decisive factor for the environmental compatibility of a means of transport is the fuel consumption per passenger or cargo item, which depends largely on the capacity utilization of the respective means of transport. Passenger cars (passenger cars) often have a low load factor, as there are often only one or two people in the vehicle. For two persons, the load factor in a car with five seats is 40%. Passenger planes, at least in terms of passengers, regularly show a higher load factor compared to passenger cars. Nevertheless, it would be desirable to improve the load factor of passenger aircraft in order to reduce overall fuel consumption.

SUMMARY OF THE INVENTION

It is the task of the invention to optimize the fuel consumption of passenger aircraft in an air transport system.

The task is solved by a method for reducing the fuel consumption of passenger aircraft in an air transport system comprising at least two airports between which there is at least one flight route. The procedure comprises the following steps:

a) Retrieving flight data F concerning the airports from an initial memory;

b) determining from the flight data F a flight route along which a number of $n \geq 2$ flights, whose departure times lie within a first time window T1, are performed by means of n first passenger aircraft;

c) determining a total number Z of passengers of the n flights and storing the total number Z of passengers in a second memory;

d) selecting $m \leq n-1$ second passenger aircraft with a total capacity $Gm \geq Z$ to perform m flights;

e) retrieving passenger data P of the n flights from a third memory and storing the passenger data P in the second memory;

f) configuring equipment characteristics Mm of the m second passenger aircraft taking into account the passenger data P;

g) performing the m flights along the determined flight route with the m second passenger aircraft with departure times in the first time window T1.

It has been shown that there are flight paths along which several flights are operated in an initial time window T1 which are regularly under-utilized. The procedure in accordance with the invention determines these flight routes and reduces the number of flights required on these flight routes, thereby improving the load factor and thus the environmental compatibility. In particular, the procedure in accordance with the invention reduces fuel consumption per passenger and kilometer as well as $CO_2$ emissions per passenger and kilometer. In addition, costs for the transport of passengers in an air transport system can be saved by the procedure according to the invention. Furthermore, the invention reduces the number of noise events in the air transport system and especially in the vicinity of airports.

The passengers of the n flights have a certain expectation of their flight and the equipment of the passenger aircraft operating the flight due to the booking with a certain airline. These expectations must be taken into account in order to be able to optimize capacity. This is done by configuring equipment characteristics Mm of the m second passenger aircraft, which is why passenger data P is used in this step. The configuration is preferably done automatically. The automatic configuration is preferably controlled by a computer, which, for example, controls servomotors of seats and/or seat rows.

The steps of the procedure according to the invention are carried out in the order given.

The retrieval of flight data F according to step a) is preferably performed by a computer. The computing unit has access to the first memory and can retrieve the flight data F.

The arithmetic unit is the preferred method for determining a flight route according to step b). The flight route is determined from the flight data F.

The arithmetic unit is preferred when determining a total number of passengers Z according to step c). The calculation unit stores the total number of passengers Z in the second memory. The first passenger planes have Mn equipment characteristics.

The arithmetic unit selects the m second passenger planes according to step d). It is advantageous for the arithmetic unit to have access to data records of available passenger planes. The total capacity Gm is the sum of the seating capacities of the m second passenger planes. Preferably, the lowest possible number m of second passenger planes available is selected. For example, it is conceivable that three flights could be carried out either by two smaller passenger aircraft or by one large passenger aircraft. In this case, the one large passenger aircraft is preferably selected as the second passenger aircraft.

The retrieval of passenger data P according to step e) is preferably performed by the arithmetic unit. The computing unit has access to the third memory and can store data in the second memory.

Instead of a single arithmetic unit, several arithmetic units can also be provided. In particular, different steps of the procedure according to the invention can be executed by different arithmetic units.

Due to the use of arithmetic units, this is preferably a computer-implemented procedure.

The method for reducing the fuel consumption of passenger aircraft in an air transport system comprising at least two airports between which at least one flight route exists is preferably carried out using a system with a computing unit, a first memory, a second memory and a third memory and comprises the following steps:
a) retrieving flight data F concerning the airports from the first memory by the arithmetic unit;
b) determining a flight route along which a number of $n \geq 2$ flights, whose departure times lie within a first time window T1, are carried out by means of n first passenger aircraft, from the flight data F by the arithmetic unit;
c) determining a total number of passengers Z of the n flights and storing the total number of passengers Z in the second memory by the arithmetic unit;
d) selecting $m \leq n-1$ second passenger aircraft with a total capacity $Gm \geq Z$ for the execution of m flights by the arithmetic unit;
e) retrieving passenger data P of the n flights from the third memory and storing the passenger data P in the second memory by the arithmetic unit;
f) configuring equipment characteristics Mm of the m second passenger aircraft taking into account the passenger data P;
g) performing the m flights along the determined flight route with the m second passenger aircraft with departure times in the first time window T1.

According to a first version, the flight path between the at least two airports is a direct flight path.

In the case of advantageous further training, the first time window T1 is less than one hour, preferably less than half an hour, particularly preferably less than a quarter of an hour. The closer two flights are to each other, the better these flights can be combined by the inventive method, since relatively fewer adjustments are necessary, for example with regard to flight plans.

Preferably, the n flights are offered by at least two different, especially competing, airlines. A major reason why several flights are scheduled for the same route in a given time slot is that several airlines offer a flight for the same route. The procedure according to the invention offers the possibility here that these flights in particular are combined. This leads to passengers from different airlines being carried in a single passenger aircraft, for example, which improves the load factor. Competing airlines are understood to mean in particular airlines that are economically separate. In particular, competing airlines do not preferably belong to the same airline alliance (e.g. Star Alliance).

It has been shown that routes served by small and medium-sized passenger aircraft in particular have low load factors. The n first passenger aircraft therefore preferably have a seat capacity of $Kn \leq 250$, preferably $\leq 200$, and especially $\leq 150$. Flight routes served by larger passenger aircraft are therefore preferably not used for the procedure according to the invention.

In order to achieve the greatest possible improvement in the load factor, it is intended that the n flights each have a maximum load factor $An \leq 90\%$, preferably $\leq 75\%$, particularly preferred $\leq 60\%$. In this way, only flights with an incomplete load factor are replaced. For these flights, the potential for improving fuel consumption is high.

The load factor of aircraft is often comparatively low or at least not optimal, especially in regional air traffic. Regional air traffic is defined as air traffic with routes (air-line distance between the starting and destination airports) of less than 1800 km (for comparison: in Germany the air-line distance between Rostock and Freiburg is about 740 km, in the USA the air-line distance between New York City and Atlanta is 1200 km). In the case of advantageous further training, it is therefore planned that in step b) only flight routes with a distance of $S \leq 1800$ km, in particular $S \leq 1000$ km, will be considered.

In addition, flights in regional air traffic are subject to strong fluctuations in terms of load factor. These fluctuations may occur, for example, within a working week, within a season or due to special events. By combining several flights at short notice, fluctuations can be balanced out much better. In step d), the m second passenger aircraft with the lowest total capacity Gm are preferably selected from an aircraft pool.

In the case of advantageous further training, it is planned that the total number of passengers Z of the n flights in step c) will be determined on the basis of bookings made. In this way, it can actually be determined how many passengers need to be transported. Subsequently, suitable second passenger aircraft or a suitable second passenger aircraft can be selected in step d). In this way, n flights can be replaced by $m \leq n-1$ flights at short notice, thus reducing overall fuel consumption.

In order to enable m flights to be replaced by n flights at short notice, it is planned, in the case of advantageous further training, that steps e) and f) are carried out in a second time window $T2 \leq 48$ h. in particular $T2 \leq 24$ h, before the departure times of the m flights. Preferably $1 h \leq T2$.

According to a second execution form, the flight path between the at least two airports is an indirect flight path and the m flights in steps d and g are direct flights, whereby the determined flight path in step g is replaced by a direct flight path.

An indirect flight route is a flight connection with at least one stopover where passengers can either disembark or board or where the passengers have to change to another passenger aircraft.

In comparison to a direct flight route, indirect flight routes have the disadvantage that the flight route is usually significantly longer, which increases fuel consumption, and that at least one additional take-off of the passenger aircraft is required, which additionally increases fuel consumption.

This is illustrated by the flight route Auckland-New Delhi:

Fuel savings in percent using the example of Auckland-New Delhi[a])

|  | $CO_2$ emissions in t | Percentage savings |
|---|---|---|
| Nonstop[a]) | 1.938 | — |
| via Kuala Lumpur[c]) | 2.498 | 22% |
| via Singapore[c]) | 2.598 | 25% |
| via Bankok[c]) | 2.254 | 14% |

-continued

| | $CO_2$ emissions in t | Percentage savings |
|---|---|---|
| via Melbourne[c] | 2.853 | 32% |
| →between 14% and 32% | | |

[a]Source: atmosfair: de on 13 Mar. 2018 at 5 pm per passenger outbound and return flight
(b) with Boeing 787-9
[c]with changing aircraft Preferably, the T1 time slot for such indirect flights is one day to one week.

Preferably, the flight route is a flight route that has been flown and reinstated. Direct flight routes between two airports are usually discontinued when they are no longer profitable for the airlines concerned, for example, when two or more providers report underutilization of their flight capacities. According to the invention, the data of these flown and then discontinued flight connections can be used to install a new direct connection between the two airports and to take the equipment features Mn of the n discontinued flights into account when configuring the equipment features Mm of the second passenger aircraft for the new direct flight to be installed.

In the case of advantageous further training, it is envisaged that the total number of passengers Z of the n flights in step (c) will be determined on the basis of forecast bookings, in particular on the basis of experience of comparable flights. This procedure is particularly advantageous for flights that are further in the future (for example, several months away). Especially for regularly occurring in flights, the total number of passengers Z can be predicted. For example, the mean value of the n flights performed in the past can be the predicted total number of passengers Z. Alternatively, the maximum number of passengers reached by flights performed in the past can be the forecast total number of passengers Z, if necessary with a correction discount.

Flight schedules with airline flights are usually determined in advance for several flight schedule periods. A distinction is made between summer and winter scheduling periods. The flight schedule periods cover the period between two time changes. The winter timetable period lasts about five months, the summer timetable period about seven months. For example, the 2017 summer scheduling period is followed by the 2017/2018 winter scheduling period (hereinafter also referred to as the 2017 winter scheduling period); the 2017 winter scheduling period is followed by the 2018 summer scheduling period.

For airlines (B2B customers) with whom medium and long-term contracts have been concluded, 3 flight schedule periods with the relevant flights shall be available in each case. On this platform, the industry standard advance booking periods (maximum 360 days) can be adhered to.

In the case of advantageous further training of the procedure according to the invention, it is intended that steps a) to d) are carried out during one flight schedule period and steps e) to g) in a later flight schedule period, in particular the next flight schedule period but one. In this way, long-term planning is possible, which in particular facilitates the coordination of the second passenger aircraft. If, for example, steps (a) to (d) are carried out in the 2017 summer scheduling period, steps (e) to (g) shall be carried out with particular preference in the 2018 summer scheduling period.

As described above, there are flights that take place regularly, for example weekly, daily or on working days. A particularly high reduction in fuel consumption of passenger aircraft in an air transport system can be achieved by replacing n regular flights with $m \leq n-1$ regular flight. In the case of advantageous further training, it is therefore planned that steps e) to g) are repeated several times, in particular regularly, following steps a) to d). The retrieval of flight data F, the determination of suitable flight routes, the determination of the total number of passengers Z and the selection of m second passenger aircraft need only be carried out once, since the m second passenger aircraft can perform each of the regularly recurring flights. The retrieval of passenger data P and the subsequent configuration of the second passenger planes is then repeated regularly, since the different passenger data P for each flight may require a different configuration.

Regularly operated flights are also referred to as air services. An example of a flight connection can be Frankfurt->Hamburg, weekly, Mondays, 8 a.m. Viewed over a scheduling period, a flight connection has g flights, where g is usually 21 to 23 for the winter scheduling period and 30 to 32 for the summer scheduling period, depending on the length of the scheduling periods. In the case of advantageous further training, it is intended that n flight connections with g flights are replaced by m flight connections with g flights. In this way, the same seat capacity is available for passengers and since $m \leq n-1$, fuel consumption is nevertheless reduced by optimizing capacity.

In order to simplify the configuration of the equipment features Mm of the m second passenger aircraft, it is planned that at least part of the passenger data P will be transferred to the m second passenger aircraft in the case of advantageous further training. The passenger data P can contain information that is not relevant for the execution of the m flights and therefore does not have to be stored in the second memory or not transferred to the m second passenger planes. The equipment characteristics Mm of the second passenger planes can then be configured taking passenger data P into account. Prior to step f), at least part of the passenger data P is retrieved from the second memory by means of a first control unit, whereby a first control signal is generated and transmitted to the m second passenger aircraft. The second passenger aircraft can each have a fifth memory in which the passenger data P is stored.

In the case of advantageous further training it is provided that before step d) general information I is retrieved from a fourth memory and used for step d). The general information I contains non-flight-specific information, in particular information on aircraft types and their characteristics. By means of the general information I, the second passenger aircraft can be better selected in such a way that a reduction in fuel consumption occurs.

As already described, passenger aircraft are also used to transport cargo on a regular basis, namely belly freight. Advantageously, it is foreseen that in step e) cargo information of the m flights, especially belly cargo information, will be determined and the cargo information will be taken into account when configuring equipment characteristics Mm of the m second passenger aircraft. The cargo information includes in particular information on the type of cargo (mail, parcels, animals, refrigerated goods, etc.), the containers used (e.g. LD3), the customer and/or the party originally commissioned with the transport. When configuring the m second passenger aircraft, the cargo information can be taken into account, for example, by providing a roller bed in an underfloor cargo area or part of it.

In the case of advantageous further training, before step d) it is checked whether second passenger aircraft with a total capacity $Gm \geq Z$ are available in an aircraft pool $m \leq n-1$, whereby the procedure is only continued if this condition is met. The aircraft pool comprises a plurality of aircraft that can basically be used as second passenger aircraft. The aircraft pool and the respective capacity of the aircraft in the aircraft pool are limited, so that it may not be possible to replace the n first passenger aircraft by m second passenger aircraft. Only when it has been determined that replacement is possible, the procedure continues with step (d). Otherwise the procedure is aborted.

The m second passenger aircraft each have a second control unit in case of advantageous further training. The second control unit can access the fifth memory and data contained therein, in particular passenger data P. The configuration of the equipment features Mm of the second passenger aircraft is preferably done by means of the second control unit.

To enable capacity optimization, the equipment features Mm of the m second passenger aircraft are preferably configured depending on the equipment features Mn of the n first passenger aircraft. In this way, passengers will find essentially the same equipment features Mm in the m second passenger aircraft as they would have found in the n first passenger aircraft.

The equipment features Mm of the m second passenger planes are configured in a particularly preferred way so that each equipment feature Mn of each of the n first passenger planes is available at least equivalently. This ensures that the passengers are provided with at least the same level of comfort, catering etc.

The equipment Mn, Mm preferably includes at least one equipment feature from at least one of the following categories: aircraft interior, aircraft exterior, accessories, branding, radio networks.

The second passenger aircraft shall preferably have a plurality of rows of seats, each with at least one seat.

The interior equipment of an aircraft includes in particular the division into booking classes and/or transport classes (e.g. first class, business class and economy class), the arrangement and spacing of the rows of seats, the seating equipment, textile goods such as floor mats and also screens that are not assigned to individual seats. The seating equipment includes in particular the design of the seat covers, the arrangement of the seat in the corresponding row of seats (window seat, aisle seat, etc.), the seating comfort (e.g. type of upholstery, size of the seat), the scope of in-flight entertainment (e.g. screen, video offer, headphone socket, power supply, Internet connection), the adaptation to corresponding entertainment technology (e.g. e.g. the provision of brackets for a tablet or smartphone brought along by the passenger, the provision of augmented reality or virtual reality by making available hardware or hardware interfaces intended for this purpose) and the seat adjustment options (e.g. seat tilt) The configuration of the aircraft's interior equipment may also include adding or removing rows of seats. Adding and removing is preferably semi-automatic or fully automatic.

The interior configuration may also include, for example, the type of cabin lighting. Different lighting concepts can be stored in a computer unit, such as dimmable light, colored light, light scenarios adapted to the flight phase or to the passengers' biorhythms. For example, the color, brightness, pattern of cabin or ceiling lighting per cabin section, per cabin side, per row of seats and/or for each seat can be individually adapted to the airline's specifications. For example, a cabin configuration management system can control illuminants, especially LEDs or OLEDs, in such a way that the illuminated area can be differentiated in relation to the different airlines.

The exterior of an aircraft includes in particular branding items on the aircraft's outer skin and/or at the entrances (for example, in the form of screens displaying a logo or lettering, or signs).

Branding articles are used in passenger aircraft to visualize which airline is operating a flight. Branding articles are therefore preferably configured depending on which airlines offer the n flights. Branding items can therefore sometimes be configured to display several airlines and/or different branding items in a single passenger aircraft symbolize different airlines, Branding items include, in particular, aircraft crew clothing, napkins, pillows and socks, antimacassars.

The accessories category includes in particular medicines, hygiene products, headphones, toy sets for children and magazines.

Radio networks include in particular WLAN and mobile phone networks. Advantageously, the second passenger aircraft support different systems, protocols, frequencies and providers.

In order to keep the effort as low as possible and thus improve the efficiency of the procedure according to the invention and at the same time meet the passengers' requirements regarding the equipment features of the second passenger aircraft, it is intended that different interior sections and/or rows of seats and/or seats in the m second passenger aircraft will be configured differently, in particular depending on the equipment features Mn of the n first passenger aircraft. As a result, only the minimum amount of work required for the various interior sections and/or rows of seats and/or seats is carried out, which increases the efficiency of capacity optimization.

Preferably, especially in intercontinental traffic, at least one of the m second passenger aircraft is a passenger aircraft with at least two passenger decks, such as the Airbus 380 or the Boeing 747. These passenger aircraft have the advantage that the individual passenger decks can be configured differently.

For example, the individual seats and/or the rows of seats have corresponding actuators that are controlled and configured in this way by means of the second control unit in the second passenger aircraft.

In the case of advantageous further training, it is intended that the passenger data P for each occupied seat in the n first passenger planes should have a booking information B, each booking information B being assigned to a seat in the m second passenger planes. Booking information B is preferably assigned to a seat by the arithmetic unit. In particular, the booking information B contains data on the equipment characteristics that the passenger booked in the corresponding seat expects.

The booking information B assigned to the individual seats can then be used to configure the equipment characteristics Mm of the m second passenger aircraft. In particular, the position of the rows of the m second passenger planes can be changed depending on the booking information B of seats in the respective row. The position is preferably changed by means of at least one servomotor.

Each seat preferably has a seating environment. The seat environment is the immediate surroundings of a seat. This includes in particular a table, a screen and storage bags, which are usually arranged on a seat of the preceding row of seats, storage facilities arranged on the seat, lighting and ventilation means for the seat and branding articles arranged in and around the seat.

Advantageously, at least one seat and/or at least one seating environment of the seat is adapted depending on the booking information B of the seat. In this way, it is possible to give each individual passenger the impression that he or she would have received on the first passenger aircraft.

In the case of particularly advantageous further training, at least one screen of a seat environment is adjusted depending on the booking information B of the corresponding seat. In this way, for example, a logo of the airline that was originally to carry out the flight of the passenger of the associated booking information B can be displayed. It is best if the second control unit of the corresponding second passenger aircraft controls the screen.

Preferably, at least one seat and/or at least one seat environment of the seat has at least the equipment level according to booking information B of the corresponding seat. This increases passenger acceptance of the combination of flights and the resulting reduction in fuel consumption. The equipment level can be understood to be both the quality and quantity of the equipment in the seat and/or the seating environment.

Usually, passengers who have made a higher-value booking (with higher-value equipment features and/or a higher booking class) have higher demands on the exact compliance with the booked equipment features. In the case of advantageous further training, it is intended that booking information B is classified into a ranking by means of criteria, whereby the booking information B is automatically distributed to the seats in the m second passenger aircraft using the ranking and the seats and/or the seating environments of the seats are configured depending on the respectively assigned booking information B. The criteria include, in particular, the booking class and the level or levels of the equipment features stored in booking information B. This ensures that passengers with a higher-quality booking are more likely to find the features they have booked or even higher-quality features.

In the case of advantageous further training, it is planned that in step e) delivery contents Ln of the n flights are determined from the passenger data P and that delivery contents Lm are delivered to the m second passenger aircraft by means of at least one delivery unit depending on the delivery contents Ln of the n flights. On the one hand, this ensures that the passengers continue to receive the desired meals in particular when optimizing capacity. On the other hand, the desired interior and exterior equipment as well as branding articles and accessories for the m second passenger aircraft can be provided in this way. The determination of the required delivery contents is preferably carried out using passenger data P, in particular booking information B.

The delivery contents Ln, Lm preferably include at least one of the following delivery contents: Catering, in particular food and beverages, interior equipment, in particular seat covers, exterior equipment, in particular signs, branding articles, in particular napkins, pillows and/or socks, antimacassars, as well as other accessories, in particular medications, hygiene articles, headgear, etc.

According to the invention, it is possible that part of the configuration of the equipment features of the second passenger aircraft is carried out manually. In the procedure according to the invention, it is therefore provided in the case of advantageous further training that flight attendants in step f) are shown on at least one display device which seat is to be equipped with which equipment features Mm and/or which delivery contents Lm.

The task of the invention is also solved by a system for reducing fuel consumption. The system according to the invention for reducing the fuel consumption of passenger aircraft in an air transport system comprising at least two airports between which at least one flight route exists, has a computing unit, a first memory, at least one second passenger aircraft, a second memory and a first control unit, wherein flight data F relating to the airports are stored in the first memory and wherein passenger data P and/or total passenger numbers Z can be stored in the second memory. The system according to the invention is characterized in that the at least one second passenger aircraft can be changed with respect to its equipment features Mm as a function of a first control signal of the first control unit.

In the case of advantageous further training, a third memory is provided in which passenger data P are stored. The third memory can be connected to airline check-in counters. The check-in desks can store or modify the passenger data P in the third memory.

In an embodiment, the system for reducing the fuel consumption of passenger aircraft in an air transport system comprising at least two airports between which at least one flight route exists, comprises a first memory in which flight data F relating to the airports is stored, at least one second passenger aircraft, a second memory in which passenger data P and/or total passenger numbers Z can be stored, a third memory, a first control unit and an arithmetic unit for retrieving flight data F relating to the airports from the first memory, for determining a flight route along which a number of n≥2 flights, whose departure times lie within a first time window T1, is performed by means of n first passenger aircraft, from the flight data F, for determining a total number of passengers Z of the n flights and storing the total number of passengers Z in the second memory, for selecting m≤n−1 second passenger aircraft with a total capacity Gm≥Z for carrying out m flights and for retrieving passenger data P of the n flights from the third memory and storing the passenger data P in the second memory, wherein the at least one second passenger aircraft can be changed with respect to its equipment characteristics Mm in dependence on a first control signal of the first control unit.

The transmission of the first control signal is preferably affected by wire (for example by means of a data line) or wirelessly (for example by means of a radio network).

The system is preferably designed for the execution of the method according to the invention. By means of the system according to the invention, a reduction of the fuel consumption of the air traffic system can be achieved by serving the flight route by the at least one second passenger aircraft. The at least one second passenger aircraft preferably has a fifth memory in which at least part of the passenger data is stored.

In the case of advantageous further training, a delivery unit is provided in the system according to the invention, which, depending on a second control signal, delivers delivery contents Lm to the at least one second passenger aircraft. In this way, the required delivery contents can be delivered automatically to the at least one second passenger aircraft. The delivery unit preferably has at least one delivery means, for example a delivery vehicle, by means of which the delivery contents are delivered to the at least one second passenger aircraft.

Preferably a first control unit is provided for retrieving the passenger data P from the second memory and for generating and transmitting the first control signal to the at least one second passenger aircraft and/or for generating and transmitting the second control signal to the delivery unit. The first control unit facilitates the coordination between the at least one second passenger aircraft and the delivery unit.

In the case of advantageous further training, a fourth memory is provided in which general information I is stored. This general information I can be used for the selection of the at least one second passenger aircraft and can be used to select the aircraft which offer the greatest advantages in terms of reducing fuel consumption.

The first memory and/or the second memory and/or the third memory and/or the fourth memory is either connected to or integrated into the arithmetic unit. Two or more of the memories may also be replaced by a common memory.

In the case of advantageous further training, it is intended that the at least one second passenger aircraft has at least one fifth memory. At least part of the passenger data P can be stored in the fifth memory, in particular by the first control unit. By means of the passenger data stored on the fifth memory, the associated second passenger aircraft can subsequently be configured without the need for a further data connection outside the passenger aircraft.

Preferably the at least one second passenger aircraft has at least one second control unit. The second control unit can be used to control and thus configure the equipment features Mm of the second passenger aircraft. The second control unit preferentially retrieves passenger data P from the fifth memory.

In the case of advantageous further training it is provided that the at least one second passenger aircraft has at least one display device which is arranged on at least one trolley in the m second passenger aircraft and/or in the area of a galley of the m second passenger aircraft. The at least one display device can indicate which seat is to be equipped with which equipment features Mm and/or which delivery contents Lm.

Characteristics described as advantageous with respect to the procedure according to the invention can also be used for advantageous further training of the system according to the invention. The same applies to the opposite case.

BRIEF DESCRIPTION OF THE DRAWINGS

The invention is illustrated and explained below using the figures as examples. It shows thereby.

DETAILED DESCRIPTION OF THE INVENTION

Figure 1:
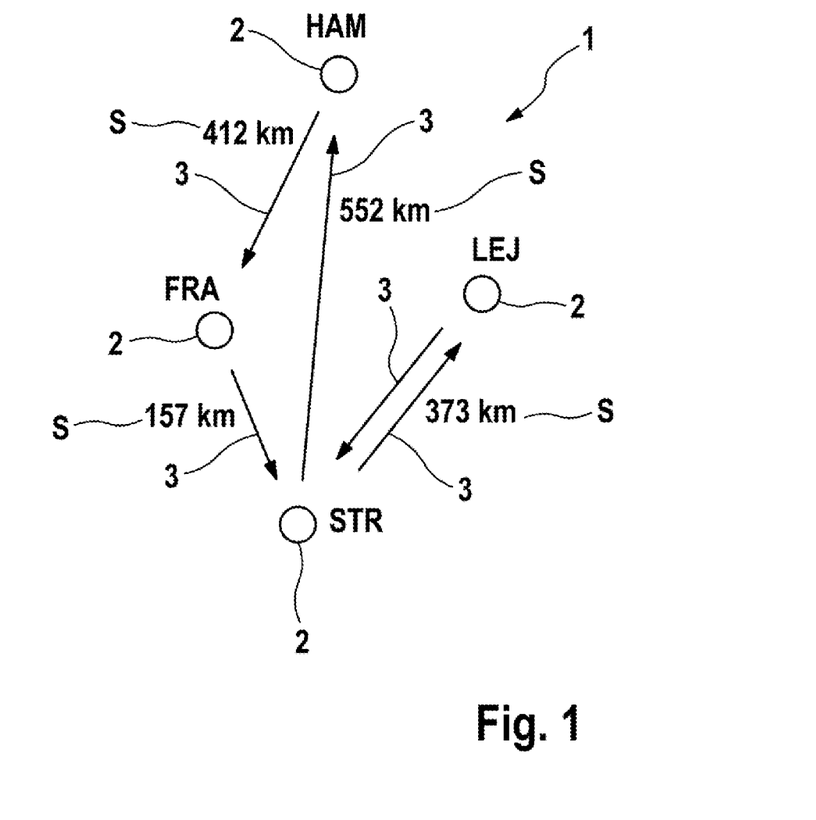
FIG. 1 schematically shows an air traffic system.

FIG. 1 shows an example of an air traffic system 1, which is used below to illustrate the procedure according to the invention. The air traffic system 1 considered here has four airports 2, namely Frankfurt am Main (FRA), Hamburg (HAM), Leipzig/Halle (LEJ) and Stuttgart (STR). In the example shown, four routes 3 are planned: from HAM to FRA, from FRA to STR, from STR to HAM, from STR to LEJ and from LEJ to STR.

The flight routes 3 are assigned the respective flight routes S (linear distance). The S routes are 412 km between Frankfurt and Hamburg, 157 km between Frankfurt and Stuttgart, 552 km between Hamburg and Stuttgart and 373 km between Leipzig/Halle and Stuttgart (and vice versa). All flight routes S and the corresponding flight routes 3 belong to the so-called regional traffic (S 1800 km).

The individual flight routes 3 are served by different airlines. This means that different airlines offer flights along the same flight route 3. Customers can book a seat on the flights offered, whereby the booking then forms booking information B of passenger data P.

Figure 2:
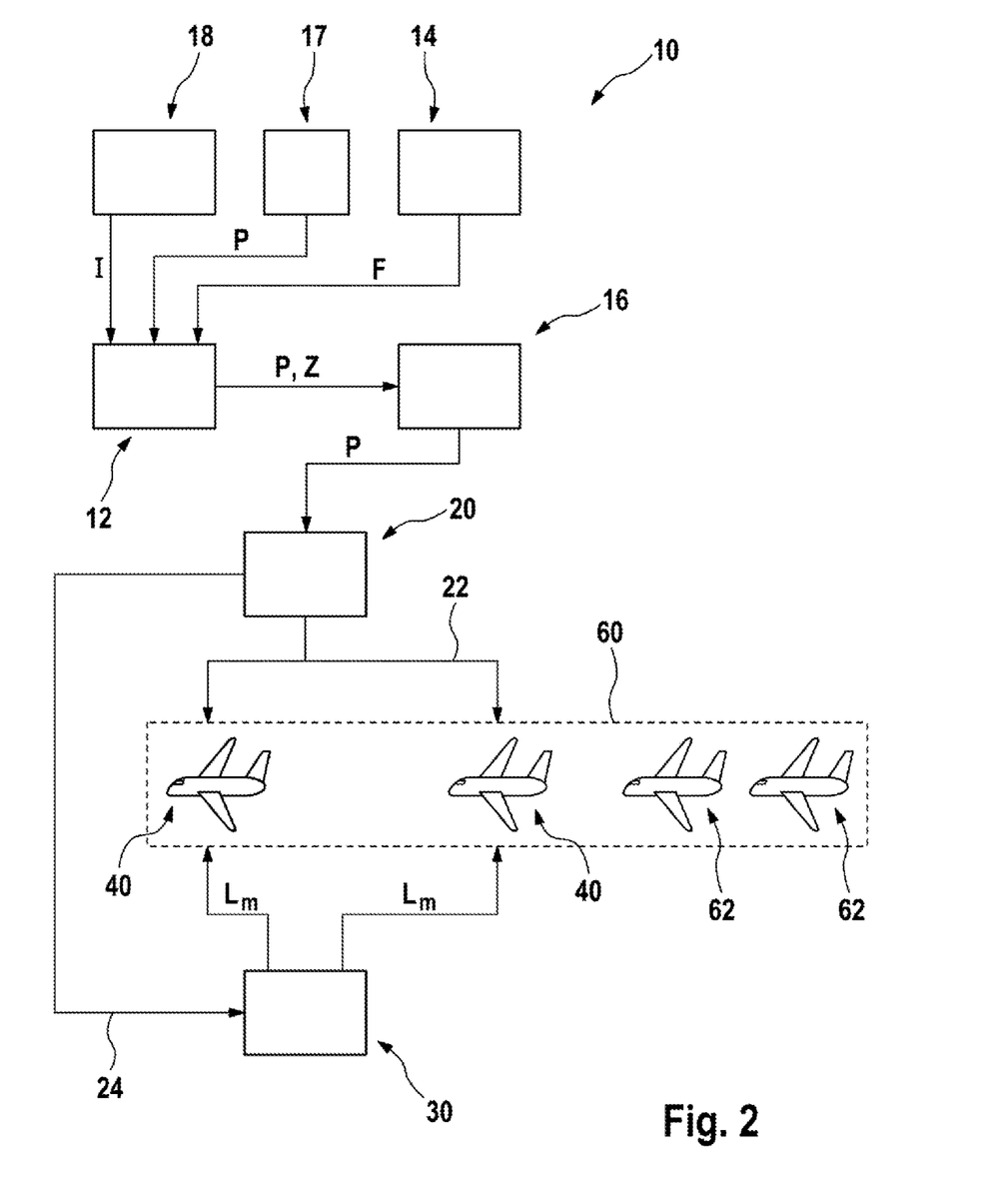
FIG. 2 schematically a system for reducing the fuel consumption of passenger aircraft.

The system 10 shown in FIG. 2 for reducing the fuel consumption of passenger aircraft in an air traffic system 1 is suitable for carrying out the procedure according to the invention. The system 10 has an arithmetic unit 12 as well as a first memory 14, a second memory 16, a third memory 17 and a fourth memory 18.

In the first memory 14 the flight data F of the air traffic system 1 according to FIG. 1 are stored. The arithmetic unit 12 retrieves the flight data F from the first memory 14 and determines from the flight data F a flight route 3 along which a number of n≥2 flights by n first passenger aircraft are performed in a given first time window T1 lying in the future. An example of flight data F is shown in Table 1.

TABLE 1

| Flight number | Starting point | Destination | Departure Time | Aircraft | Bookings |
|---|---|---|---|---|---|
| A1234 | STR | HAM | 6:30 | A319-100 | 129 |
| E4711 | STR | HAM | 6:35 | A319-100 | 120 |
| F2874 | LEJ | STR | 6:40 | 737-700 | 101 |
| F4782 | STR | LEJ | 6:50 | 737-700 | 99 |
| L1337 | STR | HAM | 6:50 | A319-100 | 135 |
| L1548 | FRA | HAM | 7:20 | 737-800 | 80 |
| L2589 | FRA | STR | 7:28 | A319-100 | 100 |

Flight data F contains information on each flight, in particular the flight number, the departure and destination locations, the departure time, the intended aircraft type (first passenger aircraft) and the number of bookings received so far.

Table 2 shows information on different types of aircraft, i.e. the capacity, i.e. the seats available for booking, the fuel consumption per flight hour in kilograms (kg) and the fuel consumption per Seat and flight hour in kilograms. All data are averages and apply to a fully-occupied aircraft (utilization=100%). The information presented in Table 2 and, if necessary, other general, i.e. non-flight-specific information I are retrieved by the computing unit 12 from a fourth memory 18. The different types of aircraft are sometimes equipped differently by different airlines or even by the same airline. The equipment is provided by the manufacturer of the aircraft, who adjusts the equipment before the delivery of the aircraft according to the request of the airline. These differences can also be stored in the information I in the fourth memory 18.

TABLE 2

| Aircraft | Seats (capacity) | Fuel per hour of flight in kg | Fuel per seat and flight hour in kg |
|---|---|---|---|
| A319-100 | 150 | 2500 | 16.67 |
| A320-200 | 180 | 2500 | 13.89 |
| 737-700 | 144 | 2420 | 16.81 |
| 737-800 | 186 | 2526 | 13.58 |
| A321-200 | 210 | 2600 | 12.38 |
| A330-220 | 290 | 5300 | 18.28 |

Source: Website Air Berlin PLC & Co. Air traffic KG

A first time window T1 of 20 minutes is given to arithmetic unit 12. From the flight data F, arithmetic unit 12 determines the flight route STR-HAM along which three flights (A1234, E4711, L1337) are offered in a first time window T1 of twenty minutes (see Table 1), n is therefore 3 (n=3).

The third memory 17 stores passenger data P for the n flights. Table 3 shows an excerpt from the passenger data P for five passengers as an example. Passenger data P is flight-specific and is usually not available months in advance but hours or days before the departure time. The passenger data P of the n flights is retrieved by arithmetic unit 12 from the third memory 17 and stored at least partially in the second memory 16.

The three flights determined are offered by three different airlines (A, E and L). For the three flights A1234, E4711, L1337, arithmetic unit 12 determines a total number of passengers Z for the flights from the passenger data P and stores this total number of passengers Z in the second memory 16. In the example shown for the three flights A1234, E4711, L1337, the total number of passengers Z=(129+120+135)=384 (see Table 1).

TABLE 3

| Passenger ID | Flight Number | Seat class | Food | Drink | Seat row spacing [inch] | Seat width [inch] |
|---|---|---|---|---|---|---|
| #1 | A1234 | Economy | No | Yes | 32 | 17 |
| #2 | A1234 | Economy | No | Yes | 32 | 17 |
| #3 | E4711 | Business | Yes | Yes | 40 | 21 |
| #4 | E4711 | Business | Yes | Yes | 40 | 21 |
| — | | | | | | |
| #384 | L1337 | Economy | No | No | 34 | 17 |

The passenger data P contains individual booking information B on the bookings made. In particular, a booking information B has an ID (passenger ID) identifying the passenger, the flight number of the flight booked by the passenger, the booked seat class, an indicator whether the passenger has booked a meal, an indicator whether the passenger has booked a drink, an indication of the seat row spacing available to the passenger in the first passenger aircraft of the booked flight, which has an effect on legroom, and an indication of the seat width available to the passenger in the first aircraft. In addition to the passenger data P mentioned above, passenger data P can also contain other information, such as special requests, more detailed information about food (amount and type) and drinks (alcoholic/non-alcoholic drinks, number of free drinks) or an indicator whether the passenger has booked a window seat.

System 10 has an aircraft pool 60 with the m second passenger aircraft 40 and further passenger aircraft 62. Table 4 contains information about aircraft pool 60. This and other information about aircraft pool 60 and passenger planes 40 and 62 can be stored in an internal memory in arithmetic unit 12. Alternatively, unit of account 12 can obtain this and other information from an external memory, for example, from the second memory 16.

Calculation unit 12 determines whether the aircraft pool 60 contains a number of m≤n−1 aircraft, that is, in the present example m≤2 aircraft with a total capacity Gm≥Z. In the present example, the two aircraft #3 and #4 (see Table 4) have a total capacity of Gm=2·210=420. The total capacity Gm is therefore greater than the total number of passengers Z=384. Thus, arithmetic unit 12 determines that the passengers of the three flights determined can be transported by aircraft #3 and #4. Thus m=2 second passenger aircraft 40 are selected to transfer the bookings of the n=3 flights, Calculation unit 12 then determines which passenger or booking is assigned to which seat in which of the two aircraft #3 and #4. This information can be added to passenger data P before passenger data P is transferred to the second memory 16. Alternatively, the passenger data P already stored in the second memory 16 can be modified and added by the arithmetic unit 12.

TABLE 4

| Aircraft ID | Aircraft type | Capacity |
|---|---|---|
| #1 | A319-100 | 150 |
| #2 | A319-100 | 150 |
| #3 | A321-200 | 210 |
| #4 | A321-200 | 210 |

From Tables 1 and 2 it is possible to make a rough calculation of the total fuel consumption for the transport of all passengers on the three flights identified: A1234, E4711, L1337. It is also possible to make a rough estimate of the fuel used by aircraft #3 and #4. The corresponding data are shown in Table 5.

TABLE 5

| | Flight 1.1 A319-100 | Flight 1.2 A319-100 | Flight 1.3 A319-100 | Flight 2.1 A321-200 | Flight 2.2 A321-200 |
|---|---|---|---|---|---|
| Utilization A in % | 86 | 80 | 90 | 91.4 | 91.4 |
| Capacity K | 150 | 150 | 150 | 210 | 210 |
| Passengers/Bookings | 129 | 120 | 135 | 192 | 192 |
| | | 384 | | 384 | |
| Fuel per flight hour in kg | 2500 | 2500 | 2500 | 2600 | 2600 |
| | | 7500 | | 5200 | |
| | | 100% | | 69.3% | |
| Fuel per seat and flight hour in kg | 19.38 | 20.83 | 18.52 | 13.54 | 13.54 |
| | | 58.73 | | 27.08 | |
| | | 100% | | 46.1% | |

As can be seen from Table 5, about half of the fuel consumption can be saved by reducing fuel consumption according to the invention. Correspondingly positive is the additional effect on the $CO_2$ emissions caused, which are also reduced.

A further calculation example is shown in Table 6. There, two underutilized A319-100s are replaced by one fully utilized A321-200. The fuel saving is almost 75%.

TABLE 6

| | Flight 1.1 A319-100 | Flight 1.2 A319-100 | Flight 2.1 A321-200 |
|---|---|---|---|
| Utilization A in % | 70 | 70 | 100 |
| Capacity K | 150 | 150 | 210 |
| Passengers/Bookings | 105 | 105 | 210 |
| | | 210 | |
| Fuel per flight hour in kg | 2500 | 2500 | 2600 |
| | | 5000 | |
| | | 100% | 52% |
| Fuel per seat and flight hour in kg | 23.81 | 23.81 | 12.38 |
| | | 47.62 | |
| | | 100% | 26% |

It should be noted that a fully loaded aircraft consumes more fuel per hour of flight than a partially loaded aircraft of the same type. In this respect, strictly speaking, the consumption figures in Table 2 are not identical for every degree of utilization of the same aircraft type. This deviation was disregarded in the calculations in Tables 5 and 6, as exact values for the individual load factors were not available. In any case, it can be assumed that a reduction in fuel consumption and $CO_2$ emissions is achieved when two or more aircraft are replaced by a smaller number of aircraft.

The system shown in FIG. 2 has a first control unit 20. The first control unit 20 accesses and retrieves passenger data P or booking information B from the second memory 16. The first control unit 20 then creates a first control signal 22 and transmits this signal together with at least part of the passenger data P to the two second passenger aircraft 40.

In addition, the first control unit 20 generates a second control signal 24 and transmits it to a delivery unit 30. The second control signal 24 contains information on the required delivery contents Lm for the two second passenger aircraft 40. The required delivery contents Lm are determined from the passenger data. The delivery unit 30 then delivers the delivery contents Lm to the two second passenger aircraft 40. The two second passenger aircraft 40 are then configured using the first control signal 22 and the delivery contents Lm.

In other forms of execution, the arithmetic unit 12 and/or the first control unit 20 can also be connected to the check-in counters and/or a central computer of at least one airline and, in particular, exchange data on individual bookings. In this way, current changes in bookings can be directly taken into account when configuring the equipment features Mm of the second passenger aircraft. In particular, the check-in counters may be connected to or have the third memory. In this way, the check-in desks can store and/or modify the passenger data P in the third memory.

Figure 3:
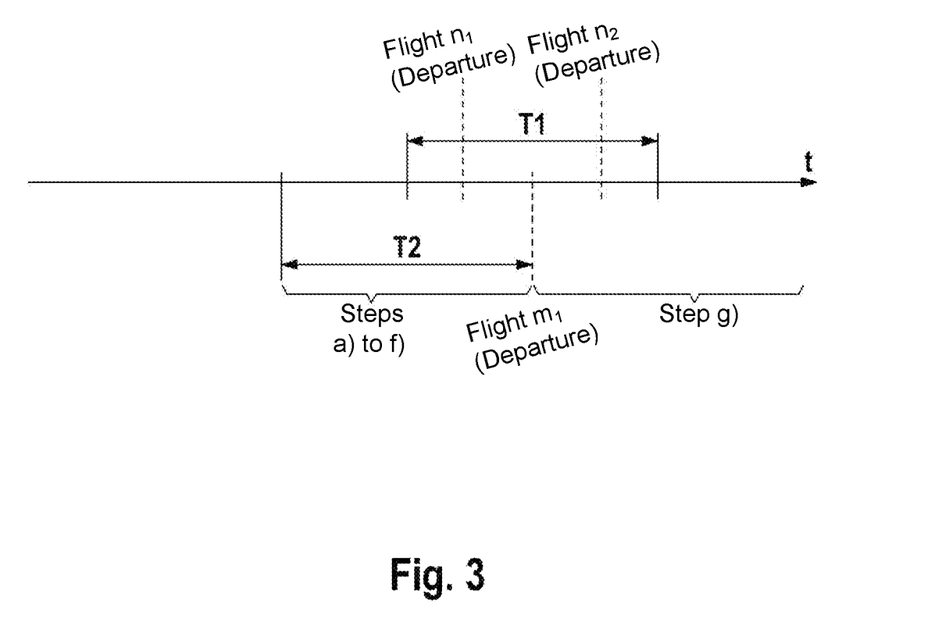
FIG. 3 a time line of the procedure according to the invention according to a first embodiment.

The procedure described above is based on actual bookings made by passengers. It is therefore a short-term replacement of the n flights by m flights. The time sequence is shown in FIG. 3. Two flights n1, n2 are replaced by one flight m1. Steps a) to f) of the procedure according to the invention all take place in a second time window T2 before the departure time of flight m1.

Figure 4:
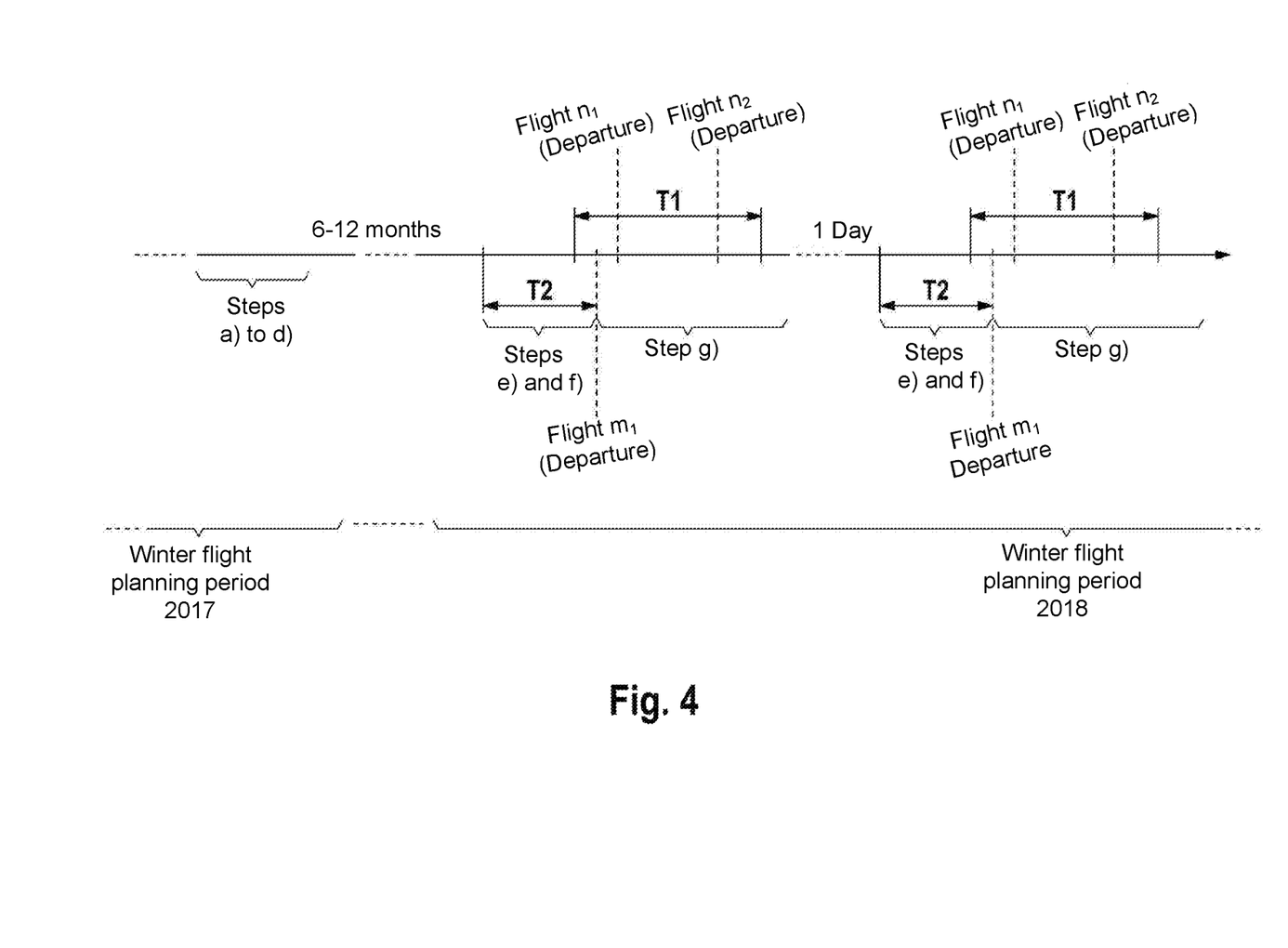
FIG. 4 a time line of the method according to the invention according to a second embodiment.

The system 10 of the invention according to FIG. 2 is also suitable for carrying out the procedure according to the invention in a different form. The time sequence of this form of execution is shown in FIG. 4. In this version of the procedure, for example, two flight connections from different airlines, whose regular flights n1, n2 have departure times in pairs in an initial time window T1, are replaced by one flight connection with the regular flight m1. The departure time of the regular flight m1 is then also in the first time window T1. The first time window T1 is also regularly recurring.

Steps a) to d) of the procedure according to the invention are carried out in this version in the winter flight schedule period of 2017, whereby flights n1, n2 are determined from the winter flight schedule period 2018. Steps e) and f) shall then be performed several times during the 2018 winter flight schedule period. In each case, flights n1, n2 shall be replaced by a flight m1. Between the 2017 and 2018 winter scheduling periods is a summer scheduling period (not shown), which is why the interval between steps (a) to (d) and the first execution of steps (e) and (f) is approximately 6 to 12 months.

For example, two flight connections from different airlines operating the route from FRA to HAM at 8 a.m. every working day may be replaced by a single flight connection operating the route from FRA to HAM at 8 a.m. every working day. The second passenger aircraft used will be configured taking into account the passenger data P available at short notice. In this execution form, the retrieval of passenger data P and the configuration of the second passenger aircraft takes place for each individual flight m1 of the replacing flight connection in a second time window T2 before the departure time of the respective flight m1. The second time slot T2 is therefore also regularly recurring.

Figure 5:
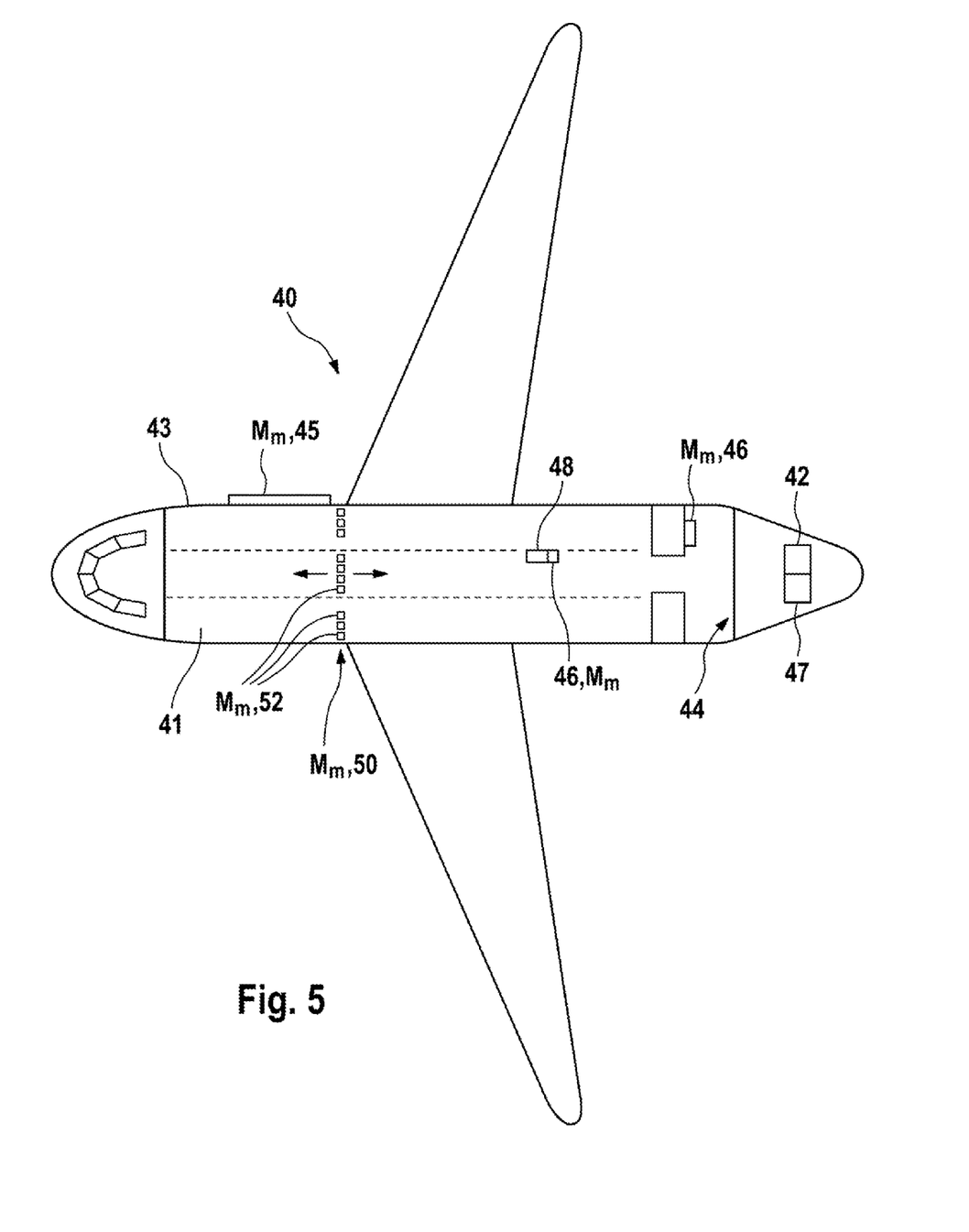
FIG. 5 schematically a second passenger aircraft.

FIG. 5 shows one of the second passenger aircraft 40 of FIG. 2. The second passenger aircraft has a cabin 41 with a galley 44 at its rear end. The galley 44 has an internal display 46 for the flight attendants. The second passenger aircraft 40 has a trolley 48 which is used, for example, to distribute food and drink during flight. For take-off and landing as well as during the stay at the airport the trolley 48 is stowed in the galley 44. The trolley also has an internal display 46 for flight attendants. An external display device 45 is located on the outside 43 of the second passenger aircraft 40.

The cabin 41 has a plurality of rows of seats 50, each with several seats 52. For a better overview only one row 50 with a total of ten seats 52 is shown. The rows of seats 50 can be moved in the longitudinal direction of cabin 41, i.e. along the arrows shown. In this way, a seat row distance, i.e. the distance between two rows of seats 50 arranged directly behind each other, can be adjusted. The seat row distance determines the legroom for the passengers sitting in seat row 50. Each seat 52 has a seating environment, which includes lighting, cooling and heating facilities and in-flight entertainment. In addition, each Seat 52 has certain functions, in particular adjustment options such as a tilt adjustment.

Not shown are actuators used to move the rows of seats. The actuators are connected to and controlled by the second control unit 42. Preferably one actuator is provided for each row of seats. By means of the servomotors the seat row distances can be adjusted.

The second passenger aircraft 40 has a second control unit 42, which receives the first control signal 22 from the first control unit 20, and a fifth memory 47. In the fifth memory 47 the first control unit 20 (see FIG. 2) stores passenger data P or at least part of the passenger data P. The second control unit 42 can access the passenger data P in the fifth memory 47. The second control unit 42 uses the first control signal 22 and/or the passenger data P to determine various equipment features Mm of the second passenger aircraft 40, in particular the position of the rows of seats 50, the seats 52 and their seating environments and the display devices 45, 46. The second passenger aircraft 40 are configured on the basis of the determined equipment features Mm.

The positions of the rows of seats 50 and thus the distances between the rows can be adjusted in this way. It is also possible to activate or deactivate individual functions of seat 52 and its seating environments.

The displays 45, 46 are controlled to display certain information. For example, the external display device 45 can display the logos of the airlines whose bookings have been assigned to the respective second passenger aircraft 40. On the internal display devices 46, the content of a booking information B assigned to a specific seat 52 can be displayed to the flight attendants. In this way, the flight attendants can further configure the respective seat 52 and the seat environment, for example, by placing branding articles and/or accessories such as magazines, magazines, and other items.

LIST OF REFERENCES

1 Air transport system
2 Airport

3 Flight route
10 System
12 Unit of account
14 First memory
16 Second memory
17 Third memory
18 fourth memory
20 First control unit
22 First control signal
24 Second control signal
30 Delivery unit
40 Second passenger aircraft
41 Cabin
42 Second control unit
43 Outside
44 Galley
45 External display device
46 internal display device
47 Fifth memory
48 Trolley
50 Row of seats
52 seats
60 Aircraft pool
62 other passenger aircraft
F Flight data
I General information
Delivery contents
Mm Equipment features of the second passenger aircraft
m1 flights
n1, n2 flights
P Passenger data
S Flight route
T1 first time window
T2 second time window
Z Total number of passengers

What is claimed is:

1. An air transport system that reduces fuel consumption of aircraft, comprising:
at least two passenger aircraft;
at least one flight route between at least two airports; and
a scheduling system comprising a computing unit, an arithmetic unit, first memory, a second memory and a third memory;
wherein the computing unit retrieves flight data F relating to the at least two airports from the first memory and determines from the flight data F a flight route along which a number of n≥2 flights, whose departure times line with a first time window T1, are carried out by n first passenger aircraft;
wherein the scheduling system determines a total passenger number Z of the n flights and stores the total passenger number Z in a second memory;
wherein the scheduling system selects m≤n−1 second passenger aircraft having a total capacity Gm≥Z for performing m flights;
wherein the scheduling system retrieves passenger data P of said n fights from the third memory and stores it in the second memory;
wherein the computing unit of the scheduling system automatically controls at least servomotors of seats and/or seat rows in the m second passenger aircraft taking into account the passenger data P; and
wherein m flights are performed along the at least one flight route with the m second passenger aircraft with departure times in the first time window T1.

2. The air transport system according to claim 1, wherein the at least one flight route is a direct flight route.

3. The air transport system according to claim 1, wherein the first time window T1 is less than one hour.

4. The air transport system according to claim 1, wherein the at least one flight route is an indirect flight route and wherein the m flights are direct flights and the determined flight route is replaced by a direct flight route.

5. The air transport system according to claim 4, wherein the first time window T1 is one day to one week.

6. The air transport system according to claim 1, wherein the at least one flight route is based on a previously flown and discontinued flight route, whereby data from the previously flown and discontinued flight route is taken into account when the scheduling system configures features Mn of the m second passenger aircraft.

7. The air transport system according to claim 1, wherein the scheduling system determines the total passenger number Z of the n flights on the basis of actual bookings or forecasted bookings.

8. The air transport system according to claim 1, at least one seat and/or at least one seat environment of the seat is adapted in dependence on booking information B of the seat.

* * * * *